United States Patent
O'Brien et al.

(10) Patent No.: US 12,202,046 B2
(45) Date of Patent: Jan. 21, 2025

(54) LASER ABLATION METHODS FOR PRODUCING FEEDSTOCK POWDER SUITABLE FOR LASER-BASED ADDITIVE MANUFACTURING

(71) Applicant: Battelle Energy Alliance, LLC, Idaho Falls, ID (US)

(72) Inventors: Robert C. O'Brien, Idaho Falls, ID (US); Owen O. Abe, Baltimore, MD (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/757,937

(22) PCT Filed: Dec. 22, 2020

(86) PCT No.: PCT/US2020/066518
§ 371 (c)(1),
(2) Date: Jun. 24, 2022

(87) PCT Pub. No.: WO2021/133757
PCT Pub. Date: Jul. 1, 2021

(65) Prior Publication Data
US 2023/0016029 A1   Jan. 19, 2023

Related U.S. Application Data

(60) Provisional application No. 62/953,337, filed on Dec. 24, 2019.

(51) Int. Cl.
*B22F 9/12* (2006.01)
*B23K 26/12* (2014.01)
(Continued)

(52) U.S. Cl.
CPC .............. *B22F 9/12* (2013.01); *B23K 26/127* (2013.01); *B23K 26/36* (2013.01); *B33Y 40/10* (2020.01);
(Continued)

(58) Field of Classification Search
CPC .... B22F 9/12; B22F 2301/00; B22F 2302/25; B23K 26/127; B23K 26/36; B33Y 40/10
See application file for complete search history.

(56) References Cited

U.S. PATENT DOCUMENTS 4,867,763 A *  9/1989  Scharf ..................... B01D 7/02
                                                 95/290
6,110,437 A    8/2000  Schall et al.
(Continued)

FOREIGN PATENT DOCUMENTS

DE      10160817 A1    6/2003
EP      3492198 A1     6/2019
(Continued)

OTHER PUBLICATIONS

Myungjoon Kim et. al. "Synthesis of Nanoparticles by Laser Ablation: A Review, KONA Powder and Particle Journal No. 34 (2017) 80-90/Doi:10.14356/kona.2017009" (Year: 2017).*

(Continued)

*Primary Examiner* — Brian D Walck
*Assistant Examiner* — Nazmun Nahar Shams
(74) *Attorney, Agent, or Firm* — TraskBritt

(57) ABSTRACT

Methods and systems for producing feedstock powders, suitable for use in laser-based additive manufacturing, use laser ablation to vaporize a source material, which may be in bulk solid or solid coarse grain form. The source material is vaporized by a laser (or other focused energy source) in a vaporization chamber that is temperature controlled to provide a vertical thermal gradient. The vertical thermal
(Continued)

gradient may be controlled to, in turn, control the nucleation, coagulation, and agglomeration of the vaporized molecules, enabling formation of microparticles that may then be used as feedstock powders in laser-based additive manufacturing. The produced feedstock powder particles may be of uniform composition, of uniform shape (e.g., substantially spherical), and of uniform phase or homogeneously mixed phases.

21 Claims, 2 Drawing Sheets

(51) Int. Cl.
  *B23K 26/36* (2014.01)
  *B23K 103/08* (2006.01)
  *B33Y 40/10* (2020.01)

(52) U.S. Cl.
  CPC ....... *B22F 2301/00* (2013.01); *B22F 2302/25* (2013.01); *B23K 2103/08* (2018.08)

(56) References Cited

U.S. PATENT DOCUMENTS

| | | | |
|---|---|---|---|
| 6,755,886 | B2 | 6/2004 | Phillips et al. |
| 6,959,815 | B2 * | 11/2005 | Xu .................. B03D 1/023 209/166 |
| 7,374,730 | B2 | 5/2008 | Simard et al. |
| 7,437,060 | B2 | 10/2008 | Wang et al. |
| 7,938,079 | B2 | 5/2011 | King et al. |
| 8,574,408 | B2 * | 11/2013 | Layman .................. F28C 3/16 75/346 |
| 9,139,478 | B2 | 9/2015 | Maskrot et al. |
| 10,144,152 | B2 | 12/2018 | Rothfuss |
| 2009/0258244 | A1 | 10/2009 | Becker et al. |
| 2015/0183055 | A1 | 7/2015 | Hariharan et al. |
| 2018/0141160 | A1 | 5/2018 | Karp et al. |
| 2018/0154103 | A1 | 6/2018 | Davis |
| 2018/0169970 | A1 | 6/2018 | Harding et al. |
| 2019/0001437 | A1 | 1/2019 | Mathisen et al. |
| 2019/0106771 | A1 | 4/2019 | Martin et al. |
| 2019/0203325 | A1 | 7/2019 | Martin et al. |

FOREIGN PATENT DOCUMENTS

| | | |
|---|---|---|
| WO | 2018/125313 A2 | 7/2018 |
| WO | 2018/128656 A1 | 7/2018 |
| WO | 2019/055630 A1 | 3/2019 |
| WO | 2019/084446 A1 | 5/2019 |

OTHER PUBLICATIONS

Prasad Govindrao Jamkhande et. al. "Metal nanoparticles synthesis: An overview on methods of preparation, advantages and disadvantages, and applications, Journal of Drug Delivery Science and Technology 53 (2019) 101174" (Year: 2019).*

Thomas J. Tague, Jr. et.al. ["Matrix Infrared Spectra of the Products of Uranium-Atom Reactions with Carbon Monoxide and Carbon Dioxide", J. Phys. Chem. 1993, 97, 10920-10924]. (Year: 1993).*

Yang Fan et. al. [CN114597384A ] (machine translation from Espacenet) (Year: 2021).*

Anderson et al. "Feedstock powder processing research needs for additive manufacturing development" Current Opinion in Solid State and Materials Science 22 (Jan. 2018) 8-15.

Anonymous, "Laser Engineered Net Shaping," Sandia National Laboratories, at https://www.sandia.gov/mst/pdf/LENS.pdf, (as archived Sep. 23, 2008), 2 pages.

Chen et al. "Synthesis and magnetic properties of $Fe_2O_3$—$TiO_2$ nano-composite particles using pulsed laser gas phase evaporation-liquid phase collecting method" Applied Surface Science 283 (Jul. 2013) 422-429.

International Search Report for International Application No. PCT/US20/66518, mailed Mar. 16, 2021, 2 pages.

International Written Opinion for International Application No. PCT/US20/66518, mailed Mar. 16, 2021, 6 pages.

Kurland et al. "Magnetic iron oxide nanopowders produced by $CO_2$ laser evaporation" Journal of Magnetism and Magnetic Materials 311 (2007) 73-77, Available online Dec. 21, 2006.

Kurland et al. "Preparation of ceramic nanospheres by $CO_2$ laser vaporization (LAVA)" Journal of the European Ceramic Society 31 (Feb. 2011) 2559-2568.

Kurland et al. Magnetic iron oxide nanopowders produced by $CO_2$ laser evaporation—'In situ' coating and particle embedding in a ceramic matrix Journal of Magnetism and Magnetic Materials 321 (Feb. 2009) 1381-1385.

Maier et al. "Development of cold spray chromium coatings for improved accident tolerant zirconium-alloy cladding" Journal of Nuclear Materials 519 (Mar. 2019) 247-254.

OPTOMEC—Additive Manufacturing—What is (AM). 9 pages, last accessed Oct. 18, 2019, available at https://www.optomec.com/additive-manufacturing/.

* cited by examiner

LASER ABLATION METHODS FOR PRODUCING FEEDSTOCK POWDER SUITABLE FOR LASER-BASED ADDITIVE MANUFACTURING

CROSS-REFERENCE TO RELATED APPLICATIONS

This application is a national phase entry under 35 U.S.C. § 371 of International Patent Application PCT/US2020/066518, filed Dec. 22, 2020, designating the United States of America and published as International Patent Publication WO 2021/133757 A1 on Jul. 1, 2021, which claims the benefit under Article 8 of the Patent Cooperation Treaty to U.S. Provisional Patent Application Ser. No. 62/953,337, filed Dec. 24, 2019, for "LASER ABLATION METHODS AND SYSTEMS FOR PRODUCING FEEDSTOCK POWDER SUITABLE FOR LASER-BASED ADDITIVE MANUFACTURING."

STATEMENT REGARDING FEDERALLY SPONSORED RESEARCH OR DEVELOPMENT

This invention was made with government support under Contract No, DE-AC07-05-ID14517 awarded by the United States Department of Energy. The government has certain rights in the invention.

TECHNICAL FIELD

This disclosure, in various embodiments, relates generally to additive manufacturing of nuclear fuels and other alloys. More particularly, this disclosure relates to the production of feedstock powder, by laser vaporization, suitable for subsequent use in additive manufacturing of advanced nuclear fuels and other alloys.

BACKGROUND

Additive manufacturing (e.g., three-dimensional (3D) printing) is a process that forms a three-dimensional structure by depositing a material, e.g., in computer-guided, defined lines or coils, layer by layer to build up the structure. Some types of additive manufacturing use a focused energy source (e.g., a laser beam) to melt and fuse a feedstock material that is initially in solid, powder form. These types of additive manufacturing may be generally known in the art as "laser-based additive manufacturing."

One type of laser-based additive manufacturing is powder bed fusion (PBF). In PBF, a bed of feedstock powder is prepared, and a laser beam (or other focused energy source) is moved selectively over the surface of the powder bed, melting and sintering the powder where the laser beam comes into contact with the powder, Elsewhere in the bed, the powder remains in its solid, powder form. Once a first layer is sintered, more powder is added to create a second layer of the powder bed. The second layer is then again subjected to the moving laser beam to melt and sinter selective areas in the second layer, e.g., on the first layer of sintered material. The process is repeated to build up and form a structure within several layers of the powder bed. The excess powder is then removed, leaving the 3D-printed structure of sintered material transformed from the initially powdered feedstock material.

Another type of laser-based additive manufacturing is powder-fed "directed energy deposition" (DED). A feedstock powder is continuously introduced through one or more nozzles toward a laser beam (or other focused energy source). Where the feedstock powder comes into contact with a focal point of the laser beam, the powder melts, forming a molten pool of material. As the laser beam is moved, e.g., added by computer guidance, the nozzle(s) is(are) moved along with the laser; so, the molten pool of material is formed along the path traveled by the laser beam and nozzle(s). As the laser beam moves away, the material of the molten pool solidifies, forming a sintered material. The laser beam and nozzle(s) may be moved successively over previously formed lines or layers to form additional lines or layers and build up a structure from the sintered material. Thus, unlike PBF, the structure may be formed as a freestanding structure, without an encompassing bed of excess powder material.

Fabricating feedstock powders for laser-based additive manufacturing, including PBF and DED, presents challenges. Known methods and systems for producing feedstock powders include mechanical attrition and atomization, each having its own benefits and challenges.

Mechanical attrition may be relatively inexpensive, using relatively inexpensive source materials (e.g., solid materials) and enabling a relatively high throughput of produced powder. However, mechanical attrition is also prone to producing defective powders, such as powders that are non-uniform in composition and of inconsistent shape (e.g., non-spherical). Non-uniform feedstock powders may include, for example, some of the powder particles of the feedstock including only one or some of the elements or compounds of the would-be homogeneous mixtures while others of the powder particles of the feedstock include another or others of the elements or compounds of the would-be homogeneous mixtures. As another example, non-uniform feedstock powders may include powder particles that include one or more elements or compounds on one portion of each of the particles while another portion of each of the particles include one or more other elements or compounds, rather than the elements and compounds being evenly, distributed and homogeneously intermixed throughout each of the powder particles. The use of non-spherical and non-uniform feedstock powders, produced by conventional mechanical attrition, tends to hinder the additive manufacturing process by, e.g., causing pores or entraining impurities within the additively manufactured structures.

Atomization, on the other hand, may be capable of creating uniform and spherical powders; however, atomization generally requires relatively expensive source material, such as expensive liquid precursors or melts. The throughput for atomization also tends to be lower than that of mechanical attrition. Moreover, atomization is prone to producing phase instabilities and segregations within the resulting powder. Therefore, the produced feedstock powder particles may each include an even intermixing of the elements or compounds of the material, but with a heterogeneous mixture of phases of the material.

Accordingly, it remains a challenge to produce a feedstock powder—suitable for use in laser-based additive manufacturing—that is uniform, substantially spherical, and of homogeneously mixed phases. It also remains a challenge to produce such feedstock powder without necessitating expensive source material.

BRIEF SUMMARY

Various embodiments of the disclosure provide methods and systems for producing feedstock powders—suitable for use in laser-based additive manufacturing—that are of uniform composition, of uniform shape (e.g., spherical), and of uniform phase or homogeneously mixed phases, unlike conventional mechanical attrition methods. Methods and systems of embodiments herein may use bulk solid or coarse powder source material, which may be relatively inexpensive in comparison to, e.g., conventional liquid precursor or melt source materials for conventional atomization methods.

Methods of embodiments of this disclosure use a controlled-cooling laser ablation (e.g., laser evaporation) technique that enables the production of feedstock powder microparticles (e.g., micrograins). These microparticles may each have a greatest dimension in the range of 1 µm to 1000 µm (e.g., 0.001 mm to 1 mm). In contrast, conventional laser ablation is generally used as a material-removal technique or as a technique for producing nanoparticles, e.g., particles with a greatest dimension between 1 nm and 100 nm (e.g., 0.000001 mm to 0.0001 mm). Accordingly, the present controlled-cooling laser ablation methods and related systems enable the relatively inexpensive production of feedstock powders that are of uniform composition, of consistent physical form (e.g., spherical), and of homogeneously mixed material phases.

In some embodiments, a method—for producing feedstock powder suitable for use in laser-based additive manufacturing—comprises directing a focused energy source toward a source material to vaporize compounds of the source material. The compounds are passed through a temperature-controlled vaporization chamber to cool the compounds and form solid microparticles.

In some embodiments, a system—for producing feedstock powder suitable for use in laser-based additive manufacturing—comprises a temperature-controlled vaporization chamber. A conduit, for a laser beam, opens into the temperature-controlled vaporization chamber. The system also comprises at least one filter after the temperature-controlled vaporization chamber.

DETAILED DESCRIPTION

Figure 1:
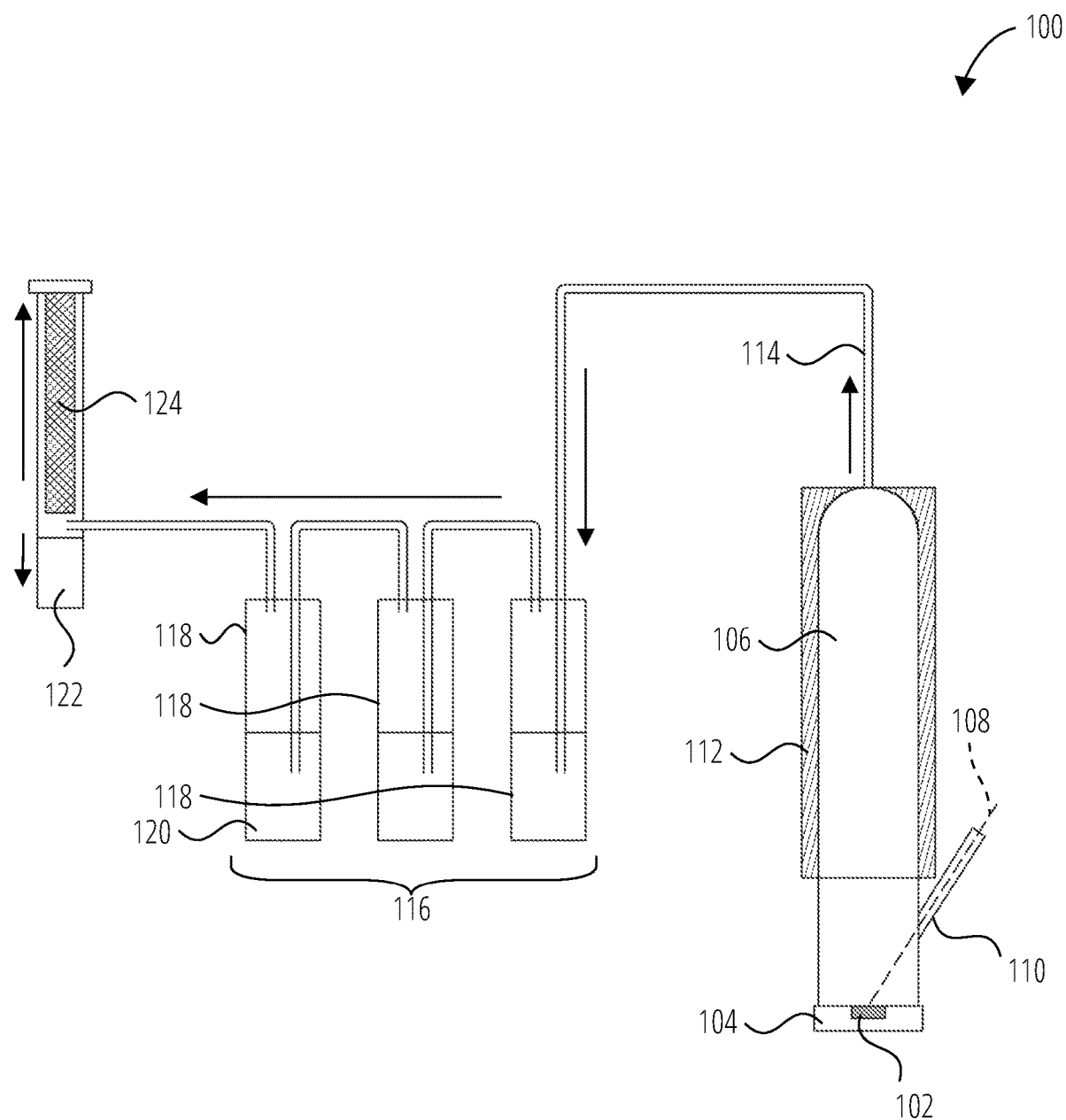
FIG. 1 is a diagram of a system used in a method for producing feedstock powder suitable for use in laser-based additive manufacturing, according to embodiments of the disclosure.

Disclosed are methods and systems for producing feedstock powders suitable for use in laser-based additive manufacturing. The methods and systems use laser ablation to vaporize a source material in a vaporization chamber that is temperature controlled to create a vertical thermal gradient. The vertical thermal gradient may be controlled to, in turn, control the nucleation, coagulation, and agglomeration of the vaporized molecules, enabling formation of microparticles that may then be used as feedstock powders in laser-based additive manufacturing.

As used herein, the term "between" is a spatially relative term used to describe the relative disposition of one material, structure, or component relative to at least two other materials, structures, or components. The term "between" may encompass both a disposition of one material, structure, or component directly adjacent the other materials, structures, or components and a disposition of one material, structure, or component indirectly adjacent the other materials, structures, or components.

As used herein, the term "proximate" is a spatially relative term used to describe disposition of one material, structure, or component near to another material, structure, or component. The term "proximate" includes dispositions of indirectly adjacent to, directly adjacent to, and internal to.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially," when referring to a parameter, property, or condition, means and includes the parameter, property, or condition being equal to or within a degree of variance from a given value such that one of ordinary skill in the art would understand such given value to be acceptably met, such as within acceptable manufacturing tolerances. By way of example, depending on the particular parameter, property, or condition that is substantially met, the parameter, property, or condition may be "substantially" a given value when the value is at least 90.0% met, at least 95.0% met, at least 99.0% met, or even at least 99.9% met.

As used herein, reference to an element as being "on" or "over" another element means and includes the element being directly on top of, adjacent to (e.g., laterally adjacent to, vertically adjacent to), underneath, or in direct contact with the other element. It also includes the element being indirectly on top of, adjacent to (e.g., laterally adjacent to, vertically adjacent to), underneath, or near the other element, with other elements present therebetween. In contrast, when an element is referred to as being "directly on" or "directly adjacent to" another element, there are no intervening elements present.

As used herein, other spatially relative terms, such as "below," "lower," "bottom," "above," "upper," "top," and the like, may be used for ease of description to describe one element's or feature's relationship to another element(s) or feature(s) as illustrated in the figures. Unless otherwise specified, the spatially relative terms are intended to encompass different orientations of the materials in addition to the orientation as depicted in the figures. For example, if materials in the figures are inverted, elements described as "below" or "under" or "on bottom of" other elements or features would then be oriented "above" or "on top of" the other elements or features. Thus, the term "below" may encompass both an orientation of above and below, depending on the context in which the term is used, which will be evident to one of ordinary skill in the art. The materials may be otherwise oriented (rotated ninety degrees, inverted, etc.) and the spatially relative descriptors used herein interpreted accordingly.

As used herein, the terms "comprises," "comprising," "includes," and/or "including" specify the presence of stated features, structures, elements, materials, components, and/or assemblies, but do not preclude the presence or addition of one or more other features, structures, elements, materials, components, and/or assemblies thereof.

As used herein, "and/or" includes any and all combinations of one or more of the associated listed items.

As used herein, the singular forms "a," "an," and "the" are intended to include the plural forms as well, unless the context clearly indicates otherwise.

As used herein, the terms "configured" and "configuration" mean and refer to a size, shape, material composition, orientation, and arrangement of a referenced material, structure, assembly, or apparatus so as to facilitate a referenced operation or property of the referenced material, structure, assembly, or apparatus in a predetermined way.

The illustrations presented herein are not meant to be actual views of any particular system, system component, or material, but are merely idealized representations that are employed to describe embodiments of the disclosure.

The materials, systems, and equipment illustrated in the figures are schematic in nature, and their shapes are not intended to be limited to the precise shape(s) or arrangement(s) illustrated, unless otherwise described.

The following description provides specific details, such as material types, equipment types, equipment arrangements, system arrangements, and operating conditions, in order to provide a thorough description of embodiments of the disclosed methods and systems. However, a person of ordinary skill in the art will understand that the embodiments of the methods and systems may, in some embodiments, be practiced without employing these specific details.

Reference will now be made to the drawings, where like numerals refer to like components throughout. The drawings are not necessarily drawn to scale.

FIG. 1 is a schematic illustration of a system 100 configured to conduct a method for producing feedstock powders, according to embodiments of the disclosure. A source material 102 is supported, e.g., by a support 104, at the base of a vaporization chamber 106.

A laser 108 is directable, through a conduit 110 that communicates into the vaporization chamber 106. The laser 108 may be focused on the source material 102. Though the laser 108 is visible through the conduit 110 illustrated in FIG. 1, the conduit 110 may be opaque in at least some embodiments. The laser 108 may be a $CO_2$ laser, another type of laser, or another type of focusable energy source (e.g., an electron beam).

The source material 102 may be a solid block of the source material 102 or may be coarse grains of the source material 102. Thus, the source material 102 may be generally less expensive to prepare than, e.g., a liquid precursor material from a conventional atomization process.

The source material 102 is formulated according to the composition of the feedstock powders that are to be produced. For example, if the feedstock powders to be produced is an alloy of elements A and B, the source material 102 comprises elements A and B. The elements of the source material 102 may be in a homogeneous or heterogeneous mixture, e.g., in about the same stoichiometric ratio as intended in the alloy for the feedstock powders.

As the laser 108 contacts the source material 102, the laser 108 heats the source material 102 to at least its vapor point, such that compounds of the source material 102 become vaporized to vertically move away from the source material 102 (and, if present, the support 104) and enter upwards into the vaporization chamber 106. In some embodiments, a carrier gas (e.g., air, argon, nitrogen, and/or another chemically inert gas) may also be introduced into the vaporization chamber 106, e.g., via the laser 108, to promote movement of the vaporized compounds upward through the vaporization chamber 106. One or more fans (not illustrated) may, therefore, be included to promote the flow of vapor and gas upward through the vaporization chamber 106.

In some embodiments, the source material 102 may be replenished in continuous fashion (e.g., by a rotating or moving platform or belt on which additional amounts of the source material 102 are added outside of the vaporization chamber 106 prior to the additional amounts of the source material 102 being moved under the vaporization chamber 106 to come into contact with the laser 108.

The vaporization chamber 106 is thermally controlled, e.g., by a temperature controller 112. For example, heating elements may be included along the lower portions of the vaporization chamber 106 while cooling elements may be included along the upper portions of the vaporization chamber 106, forming a controllable vertical thermal gradient through a height of the vaporization chamber 106. Therefore, as the vaporized compounds from the source material 102 move upward through the vertical thermal gradient of the vaporization chamber 106, the compounds are cooled at a controlled rate.

Figure 2:
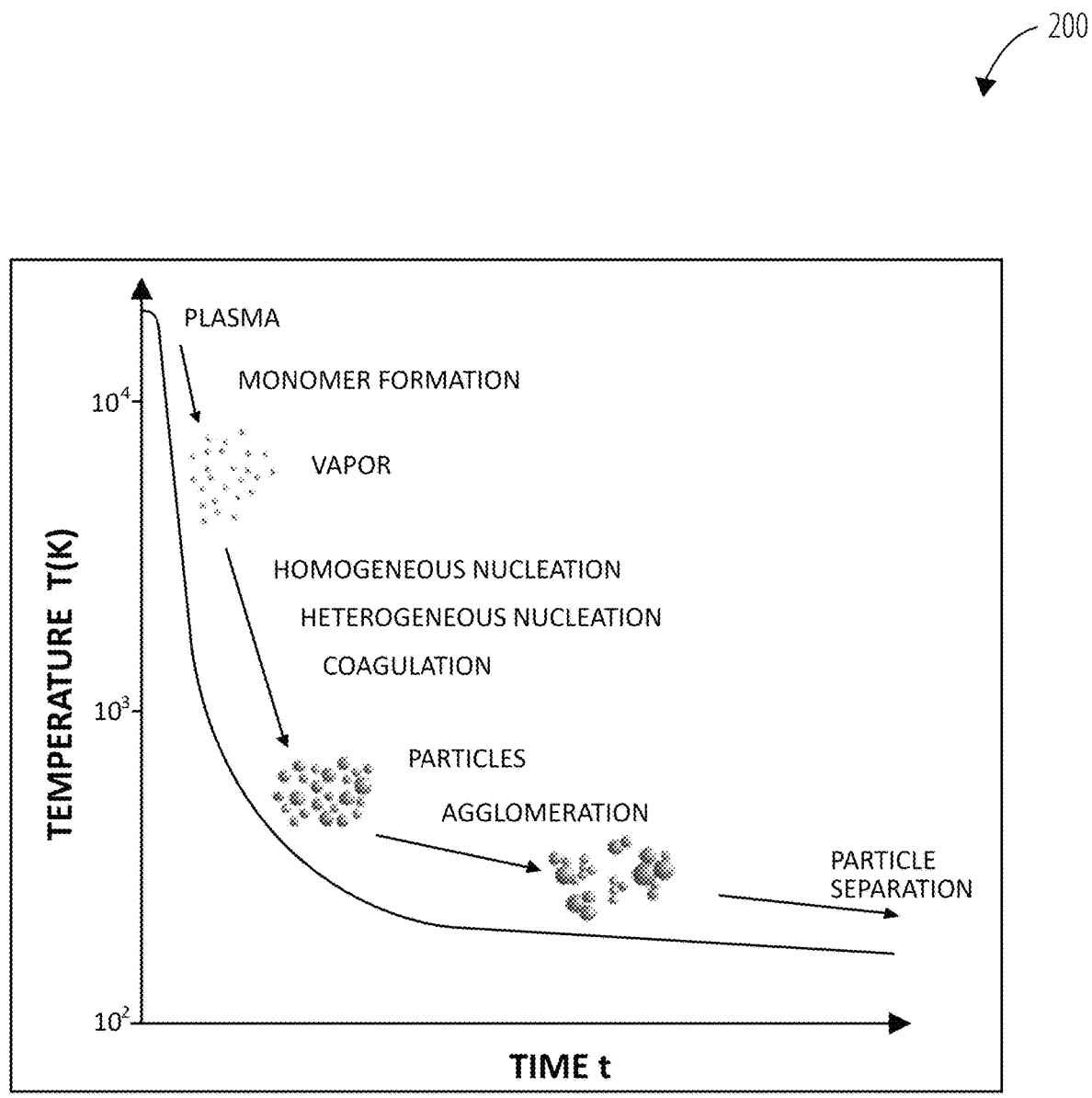
FIG. 2 is a chart illustrating a particle formation process, according to embodiments of the disclosure, as a function of time versus temperature.

A chart 200 of FIG. 2 illustrates the thermal gradient's impact on the nucleation, coagulation, and agglomeration of the vaporized compounds. As the temperature decreases, and with time, "vapor" moves through homogenous nucleation, heterogeneous nucleation, and coagulation to form melt droplets (e.g., the "particles" of the chart 200). Further lowering the temperature, e.g., as the melt droplets move vertically upward through the vaporization chamber 106 and continue to cool, the post-nucleation and post-coagulation droplets agglomerate into larger droplets. With still additional lowering of temperature, e.g., proximate the top of the vaporization chamber 106, the agglomerated droplets solidify into microparticles, which exhibit particle separation. That is, they no longer combine with one another, but form individual microparticles, e.g., a solid powder material.

The system 100 may also be configured to prevent the vaporized compounds from condensing upon the internal surface of the vaporization chamber 106. For example, the use of a carrier gas in conjunction with a controlled cooling profile may discourage the vaporized compounds from resting upon the internal surfaces of the vaporization chamber 106.

The so-formed particles, e.g., microparticles, in the lowest temperature portion of the vertical thermal gradient, e.g., proximate the top of the vaporization chamber 106, may be of generally uniform composition (e.g., a composition evenly distributed and/or homogeneously intermixed across each of the particles), of uniform shape (e.g., each particle being substantially spherical), and of uniform phase (e.g., each particle exhibiting a homogeneous material phase). Thus, the formed microparticles are well-suited for use as feedstock powders for, e.g., laser-based additive manufacturing.

With continued reference to FIG. 1, the particles exit through the top of the vaporization chamber 106, through conduit 114. In some embodiments, the system 100 may include an oil bubbler filtration unit 116 through which the particles are passed, after exiting the vaporization chamber 106. The oil bubbler filtration unit 116 may include a plurality of oil bubblers 118, each including oil 120 in the bottom of a container. An incoming conduit, e.g., conduit 114, extends downward such that an opening of the incoming conduit (e.g., the conduit 114) is within the oil 120. An outgoing conduit does not extend into the oil 120, As particles pass into the oil 120 of the oil bubblers 118, the particles pass through the oil 120 before exiting each respective oil bubbler 118 to move into the next of the oil bubblers 118 of the oil bubbler filtration unit 116. Such an oil bubbler filtration unit 116 may be configured to remove any impurities from the particles.

Particles exiting the oil bubbler filtration unit 116 may then move on to be collected in a receptacle 122. Above the receptacle 122, a filter 124 (e.g., a HEPA (high efficiency particular air) filter) may be included, e.g., to capture any impurities still in a vapor state before a carrier gas (e.g., air) exits through the top of the filter 124. Therefore, particles formed in the vaporization chamber 106, from the source material 102, are either collected in the receptacle 122 or are retained in the filter 124 and do not exit the system 100 with the carrier gas.

In some embodiments, the collected feedstock powder particles may then be subjected to atomic layer deposition (ALD), to add additional material, such as adding a layer of material directly on an outer surface of each of the microparticles formed by the cooling-controlled laser ablation. The additional material may have the same or a different chemical composition as the feedstock powder particles. The ALD may therefore increase the size (e.g., greatest outer dimension) of the microparticles. After the ALD, if included in the method, the particles of the feedstock powder so produced may remain microparticles, though a larger microparticle than formed from only the cooling-controlled laser ablation.

The methods and/or the system 100 of embodiments of this disclosure may be used to form high-quality feedstock powders, such as metals, metal oxides, and/or mixed-metal oxides. Therefore, the source material 102 may comprise the elements and/or compounds of the metals, metal oxides, and/or mixed-metal oxides.

In some embodiments, the produced feedstock powders may comprise, consist essentially of or consist of a metal oxide formulated as a nuclear fuel material (e.g., $UO_2$, $PuO_2$), and the produced feedstock powders may be used to additively manufacture, by a laser-based additive manufacturing technique, nuclear fuel structures for use in, e.g., uranium enrichment or plutonium enrichment. In such embodiments, the source material 102 may comprise oxygen and at least one of uranium and/or plutonium. And, more than one vaporization chamber 106 may be used in the system 100. For example, in some embodiments, one or more vaporization chambers 106 may be used exclusively for producing feedstock powder for additive fabrication of nuclear fuel, and one or more others of the vaporization chambers 106 may be used with non-nuclear related feedstock powder production processes.

The particular materials, method acts, system equipment, system configurations, and operating conditions discussed in these non-limiting examples may be varied and are cited merely to illustrate at least one embodiment and are not intended to limit the scope thereof. Further, while the feedstock powder produced by the apparatus and methods of the disclosure is suitable for use in laser-based additive manufacturing techniques, applications for the powder so produced are not so limited.

Non-limiting, example embodiments may include the following, alone or in combination:

Embodiment 1: A method for producing feedstock powder suitable for use in laser-based additive manufacturing, the method comprising: directing a focused energy source toward a source material to vaporize compounds of the source material; and passing the compounds through a temperature-controlled vaporization chamber to cool the compounds and form solid microparticles.

Embodiment 2: The method of Embodiment 1, further comprising passing the solid microparticles through an oil bubbler filtration unit.

Embodiment 3: The method of any one of Embodiments 1 or 2, further comprising depositing, by atomic layer deposition, additional material onto an outer surface of each of the solid microparticles.

Embodiment 4: The method of any one of Embodiments 1 through 3, wherein directing the focused energy source toward the source material comprises directing the focused energy source toward a solid source material.

Embodiment 5: The method of any one of Embodiments 1 through 4, further comprising providing the source material in a form of a solid hulk material.

Embodiment 6: The method of any one of Embodiments 1 through 4, further comprising providing the source material in a form of solid coarse grains.

Embodiment 7: The method of any one of Embodiments 1 through 6, further comprising introducing a carrier gas into the vaporization chamber.

Embodiment 8: The method of Embodiment 7, further comprising passing the carrier gas through a HEPA filter.

Embodiment 9: The method of any one of Embodiments 1 through 8, wherein passing the compounds through the temperature-controlled vaporization chamber comprises providing a vertical thermal gradient in the temperature-controlled vaporization chamber.

Embodiment 10: The method of any one of Embodiments 1 through 9, wherein directing the focused energy source toward the source material comprises directing a laser toward the source material.

Embodiment 11: The method of Embodiment 10, wherein directing the laser toward the source material comprises directing a carbon dioxide laser toward the source material.

Embodiment 12: The method of any one of Embodiments 10 or 11, wherein directing the laser toward the source material comprises directing the laser toward a source material comprising uranium and/or plutonium.

Embodiment 13: The method of any one of Embodiments 1 through 12, further comprising providing the source material, the source material comprising at least one of uranium oxide and plutonium oxide.

Embodiment 14: The method of any one of Embodiments 1 through 13, further comprising collecting the solid microparticles, the solid microparticles each having a greatest dimension in a range of 1 μm to 1000 μm and being substantially spherical.

Embodiment 15: A system for producing feedstock powder suitable for use in laser-based additive manufacturing, the system comprising: a temperature-controlled vaporization chamber; a conduit, for a laser beam, opening into the temperature-controlled vaporization chamber; and at least one filter after the temperature-controlled vaporization chamber.

Embodiment 16: The system of Embodiment 15, wherein the at least one filter comprises an oil bubbler filtration unit.

Embodiment 17: The system of any one of Embodiments 15 or 16, wherein the at least one filter further comprises a HEPA filter.

Embodiment 18: The system of any one of Embodiments 15 through 17, further comprising, at a base of the temperature-controlled vaporization chamber, a support for a source material.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method for producing feedstock powder suitable for use in laser-based additive manufacturing, the method comprising:
    directing a focused energy source toward a solid source material to vaporize compounds of the solid source material; and
    passing the compounds through a temperature-controlled vaporization chamber to cool the compounds and form solid microparticles comprising the compounds.

2. The method of claim 1, further comprising passing the solid microparticles through an oil bubbler filtration unit.

3. The method of claim 1, further comprising depositing, by atomic layer deposition, additional material onto an outer surface of each of the solid microparticles.

4. The method of claim 1, further comprising providing the solid source material in a form of a solid bulk material.

5. The method of claim 1, further comprising providing the solid source material in a form of solid coarse grains.

6. The method of claim 1, further comprising introducing a carrier gas into the temperature-controlled vaporization chamber.

7. The method of claim 6, further comprising passing the carrier gas through a HEPA filter.

8. The method of claim 1, wherein passing the compounds through the temperature-controlled vaporization chamber comprises providing a vertical thermal gradient in the temperature-controlled vaporization chamber.

9. The method of claim 1, wherein directing the focused energy source toward the solid source material comprises directing a laser toward the solid source material.

10. The method of claim 9, wherein directing the laser toward the solid source material comprises directing a carbon dioxide laser toward the solid source material.

11. The method of claim 9, wherein directing the laser toward the solid source material comprises directing the laser toward a solid source material comprising uranium and/or plutonium.

12. The method of claim 1, further comprising providing the solid source material, the solid source material comprising at least one of uranium oxide and plutonium oxide.

13. The method of claim 1, further comprising collecting the solid microparticles, the solid microparticles each having a greatest dimension in a range of 1 µm to 1000 µm and being substantially spherical.

14. A method for producing feedstock powder suitable for use in laser-based additive manufacturing, the method comprising:
    directing a focused energy source toward a solid source material to vaporize compounds of the solid source material, comprising passing a laser beam through a conduit opening into a temperature-controlled vaporization chamber;
    passing a carrier gas and the compounds through the temperature-controlled vaporization chamber comprising cooling elements to cool the compounds and form solid microparticles comprising the compounds; and
    passing the carrier gas through at least one filter after the temperature-controlled vaporization chamber.

15. The method of claim 14, wherein passing the carrier gas through the at least one filter comprises passing the carrier gas through an oil bubbler filtration unit.

16. The method of claim 14, wherein passing the carrier gas through the at least one filter comprises passing the carrier gas through a HEPA filter.

17. The method of claim 14, further comprising, before directing the focused energy source toward the solid source material, providing the solid source material on a support at a base of the temperature-controlled vaporization chamber.

18. The method of claim 1, further comprising, with at least one filter, collecting the solid microparticles in a receptacle, the solid microparticles being of substantially uniform material phase or homogeneously mixed material phases.

19. The method of claim 1, further comprising, with at least one filter, collecting the solid microparticles in a receptacle, the solid microparticles being substantially spherical and of substantially uniform composition.

20. The method of claim 1, wherein passing the compounds through the temperature-controlled vaporization chamber comprises controlling the temperature-controlled vaporization chamber temperature with a temperature controller within the temperature-controlled vaporization chamber.

21. The method of claim 1, wherein passing the compounds through the temperature-controlled vaporization chamber comprises controlling the temperature-controlled vaporization chamber temperature with a temperature controller within the temperature-controlled vaporization chamber, the temperature controller comprising heating elements along a first portion of the vaporization chamber and cooling elements along a second portion of the vaporization chamber.

* * * * *